United States Patent [19]

Howell et al.

[11] Patent Number: 5,286,399
[45] Date of Patent: Feb. 15, 1994

[54] FLOOR SWEEPING COMPOSITION

[75] Inventors: George E. Howell, Minnetonka Beach; Charles D. Wright, White Bear Lake, both of Minn.

[73] Assignee: Akona Corp., Maple Plain, Minn.

[21] Appl. No.: 930,992

[22] Filed: Aug. 17, 1992

[51] Int. Cl.$^5$ ............................................. C09K 3/22
[52] U.S. Cl. .................................................. 252/88
[58] Field of Search ........................................ 252/88

[56] References Cited

U.S. PATENT DOCUMENTS

| | | | |
|---|---|---|---|
| 678,981 | 7/1901 | Rosenfeld | 252/88 |
| 788,042 | 4/1905 | Getz | 252/88 |
| 803,632 | 11/1905 | Singer | 252/88 |
| 858,413 | 7/1907 | Niewind et al. | 252/88 |
| 873,913 | 12/1907 | Vernon et al. | 252/88 |
| 881,859 | 3/1908 | Hegyi | 252/88 |
| 884,558 | 4/1908 | Beman | 252/88 |
| 908,041 | 12/1908 | Severns | 252/88 |
| 913,476 | 2/1909 | Duffy | 252/88 |
| 939,369 | 11/1909 | Wolfgram et al. | 252/88 |
| 943,667 | 12/1909 | Ellis | 252/88 |
| 1,758,735 | 5/1930 | Conrad | 252/88 |
| 1,916,163 | 6/1933 | Worth | 252/88 |
| 2,692,861 | 10/1954 | Weeks | 252/88 |
| 3,533,953 | 10/1970 | Mills et al. | 252/88 |
| 3,632,514 | 1/1972 | Blocher | 252/88 |

Primary Examiner—Prince Willis, Jr.
Assistant Examiner—J. Silbermann
Attorney, Agent, or Firm—Richard E. Brink

[57] ABSTRACT

Floor sweeping compound of the type conventionally containing sawdust, sand, and petroleum oil is modified by substituting, for the petroleum oil, inexpensive acid oils (or their salts) obtained as byproducts during the process of refining plant-derived oil, thereby rendering the compound both biodegradable and less expensive.

8 Claims, No Drawings

FLOOR SWEEPING COMPOSITION

BACKGROUND OF THE INVENTION

Floor sweeping compositions are notoriously old, having been in existence for perhaps a century. Typical compositions have been made up of sand or other inorganic particulate material, sawdust, and some type of oil; the sand provides weight that keeps the composition from blowing away, while the sawdust absorbs the oil, which enable it to collect the dust from the floor. Numerous oils have been suggested, e.g., "suitable non-drying vegetable oil or animal fat, such as olive-oil or lard, rosin, and pine-tar" (U.S. Pat. No. 788,042), "oils or fats, both animal and vegetable, as well as mineral oils" (U.S. Pat. No. 678,981), "kerosene or any other product of petroleum or, in fact, any non-volatile oil" (U.S. Pat. No. 803,632), "sassafras oil" (U.S. Pat. No. 884,558), and "cedar oil" (U.S. Pat. No. 1,758,735). In some instances the oil-absorbed sawdust has been partially replaced with "oil meal, linseed, cottonseed, or both" (U.S. Pat. No. 873,913) or "corn meal" (U.S. Pat. No. 858,413). By far the most common oil, however has been petroleum oil, which is not only expensive but also barred from disposal in many landfill sites. Vegetable oils, which hydrolyze readily and are much more biodegradable than petroleum oils, would be acceptable in landfill sites, but tend to be even more expensive than petroleum oil. All vegetable oils consist essentially of triesters of glycerol and various fatty acids, many having a high degree of unsaturation and tending to become rancid upon standing.

BRIEF DESCRIPTION

The present invention provides an improved floor sweeping compound that is comparatively inexpensive, employing a dust-absorbing plant-derived liquid that is readily biodegradable and yet is protected against becoming rancid. This liquid is typically a byproduct of the normal process of refining vegetable oils.

Most crude vegetable oils, which are generally obtained by crushing seeds and either expressing the oil or extracting it with hexane, contain a small percentage of undesirable impurities that are removed in a multi-step refining process. A typical process involves (1) degumming by mixing the oil with water to remove phosphatides, (2) adding NaOH to the degummed oil to form a soap with the free fatty acids (typically 0.2–0.3% of the crude oil), (3) centrifuging to remove the raw soap stock, and (4) acidulating with $H_2SO_4$ to recover the free fatty acids and perhaps an equal amount of triglycerides to arrive at what is called "acid oil" or "soap stock." If allowed to stand, this acid oil byproduct separates into three layers. The top layer, which is preferred for use in practicing the present invention, has a neutral pH, only a low odor, and is water-free. The middle layer, which is considerably less expensive and hence may be desirable in practicing the invention, also has a low odor but is an emulsified mixture of about 40% acid oils, 40% water, and 20% other materials. The bottom layer, which may also prove useful in practicing the invention, is still less expensive, containing water, probably some glycerine, some acid oils, and perhaps other water-soluble materials. Oily compositions useful in practicing the invention will generally contain at least about 20% (preferably at least about 40%) acid oils or salts thereof.

After considerable research, applicants have found that these "acid oils" (or even the extremely inexpensive raw soapstock) can replace petroleum oil in floor sweeping compositions, simultaneously reducing the cost of such compositions and rendering them acceptably biodegradable. Further, To inhibit the development of rancidity of the compositions, applicants have found it desirable to add small amounts of antioxidant.

DETAILED DESCRIPTION

Understanding of the invention will be enhanced by a detailed study of soybean acid oil and its use in a particular floor sweeping composition.

Soybean soap stock, or acid oil, typically contains approximately the following types and amounts of fatty acids: myristic, 0.1%; palmitic, 12.3; stearic, 4.5%; oleic, 21.6%; linoleic, 52.1%; linolenic, 7.8%; arachidic, 0.3%; behenic, 0.4%; unidentified, 0.9%. From these figures it can be calculated that at least 81.6% of the acids contain at least one double bond. It is assumed that the triglycerides, which make up about half of the soybean acid oil, have a similar distribution of acids and unsaturation. Soybean acid oil is black in color, the result of the acidulation process. Typical viscosities are 175 cps at 0° C. and 30–50 cps at 25° C.

Unsaturated fatty acids and their glycerides are prone to auto-oxidation, especially when spread in the thin layers that occur when they are incorporated in floor sweeping compound. The oxidation products are a complex mixture of volatile aldehydes, ketones, and acids, yielding a generally unpleasant rancid odor that greatly detracts from the appeal of a given sweeping composition. Applicants have found that the addition of small amounts of such antioxidants as the phenolics or tocopherols greatly extends the shelf life of sweeping compositions incorporating vegetable acid oil. It is desirable that the antioxidant be initially soluble in the vegetable acid oil and remain so throughout the storage life of the sweeping composition.

EXAMPLE 1

A currently preferred floor sweeping composition is prepared as follows: First, a premix is prepared by mixing 2 gallons of soybean acid oil and, as an antioxidant composition, a blend of 0.48 lb. butyl hydroxy toluene (e.g., "Vulkanox" KB, commercially available from Mobay), and 0.96 lb. "Tenox" 21 (a blend of 32% glyceryl monooleate, 32% corn oil, 20% tert-butylhydroquinone, 15% propylene glycol, and 1% citric acid, available from Eastman Chemical Products, Inc.). Next an open top ribbon blender is charged with 1600 lbs. 60-mesh silica sand, and 550 lbs. of coarse pine sawdust (up to 3/16 inch), continuing blending until a uniform mixture is obtained. At this time 40–70 gallons of soybean acid oil, the aforementioned premix, and 0.125 gallon of 65% red dye No. 168-78 in toluene are sprayed onto the mixture and blending continued until the mixture is uniform, as determined by squeezing a handful, which should feel wet and tacky but not clump; about 5–20 minutes mixing time is typical. The mixture is then packaged. The finished floor sweeping composition functions well for its intended use, resists becoming rancid at normal storing conditions for up to a year, and is readily accepted by landfill sites, where it quickly biodegrades. If desired, the antioxidants can be mixed directly into the supply tank of acid oil, eliminating the need of preparing a premix.

EXAMPLE 2

Using the same general procedure described in Example 1, and using a laboratory dough blender, a sweeping compound was prepared by dissolving 0.1 g "Vulkanox" KB and 0.2 g "Tenox" 21 in 131 g "Kappa" 612 A and then mixing with 445 g 60-mesh washed sand, and 152 g sawdust. "Kappa" 612 A, obtained from Kappa Products, Chicago, Ill., is a dark brown, slightly pungent acidulated oil mixture containing at least 80% vegetable oils and up to 20% animal fats; some hydrogenated oils and some palm kernel oils may be present. The sweeping compound was placed in an open container and tested for accelerated aging at 120° F. in a non-circulating oven. After 72 hours, no increase in rancid odor was observed, and the compound functioned satisfactorily for sweeping purposes.

EXAMPLE 3

Example 2 was repeated, substituting "Kappa" 612 C for the "Kappa" 612 A. "Kappa" 612 C is a golden brown acidulated mixture of corn oil and soybean oil, with a fresh woody odor, made generally by the process described in Example 1. When tested as described in Example 2, the resultant sweeping compound performed equally satisfactorily.

EXAMPLE 4

Example 2 was repeated, substituting "SVO SC 2143" for the "Kappa" 612A. "SVO SC 2143," obtainable from the Specialty Vegetable Oils Division of Agrigenetics, Culbertson, Mont., is a so-called "raw" soapstock, derived from safflower/sunflower seeds, in which the oil has not been degummed but has been treated with sodium hydroxide and not acidulated; this extremely inexpensive product thus consists of the sodium salt of fatty acids in up to 60% water. When tested as described in Example 2, the resultant sweeping compound performed equally satisfactorily.

EXAMPLE 5

Example 2 was repeated, substituting "Kappa" 612D for the "Kappa" 612 A and omitting both the "Vulkanox" KB and the "Tenox" 21. "Kappa" 612D, which is the residue remaining after steam stripping refined corn oil, soybean oil, or both (i.e., the oil remaining after removal of the raw soapstock), to deodorize the oil, is a dark brown liquid having a strong sweet odor; it normally contains 40-80% of the more volatile free fatty acids, the remainder being glycerides, and may also contain up to 3% tocopherol, a naturally occurring antioxidant. When tested as in Example 2, the sweeping compound of this example performed equally satisfactorily.

EXAMPLE 6

Following the general procedure of Example 2, a sweeping compound was prepared from 0.33 g "Vulkanox" KB, 0.66 g "Tenox" 21, 200 g soybean acid oil, 318 g 60-mesh sand, 57 g sawdust, and 5.7 g shredded paper. This product, which offers the advantage of using recycled paper products, functioned satisfactorily. It is believed that, by reducing the amount of sawdust, adjusting the amount of acid oil, or employing slightly larger paper particles, a still larger amount of paper could be incorporated in the product.

EXAMPLE 7

Following the general procedure of Example 2, a sweeping compound was prepared from 0.4 g "Vulkanox" KB, 0.8 g "Tenox" 21, 242 g pine oil acid ("Actinol" FA-1, commercially available from Arizona Chemicals), 890 g. sand, and 295 g saw-dust. The compound functioned satisfactorily for its intended purpose.

EXAMPLE 8

Following the general procedure of Example 2, a sweeping compound was prepared from 0.4 g "Vulkanox" KB, 0.8 g "Tenox" 21, 412 g "Kappa Middle Phase", 890 g sand, and 295 g sawdust. ("Kappa Middle Phase" is a dark chocolate brown liquid of the type alluded to in the second paragraph preceding the "Detailed Description" hereinabove, constituting an emulsified mixture of acid oils, water, and other materials). This compound functioned satisfactorily for its intended purpose.

As is well known in the art, various dyes can be added to sweeping compounds to obtain a desired color. In practicing the present invention, it is preferred to use edible food grade dyes, yielding a sweeping compound incorporating only natural nontoxic ingredients. For example, when increasing amounts of FD&C Blue #1 Lake (Dye No. 09117, Lot G598) in soybean oil are added to the masterbatch referred to in Example 1, sweeping compounds having a progressively deeper shade of green are obtained. If FD&C Yellow #1 Lake (Dye No. 09705, Lot 2635H) in soybean oil is substituted, a medium muddy yellow sweeping compound results. When FD&C #40 Lake (Dye No. 09334, Lot 3756H) in soybean oil is substituted, a medium bright red sweeping compound is obtained.

It will be readily appreciated that the acid oil byproducts or their salts obtained in the refining of other oils (e.g., nondrying oils such as castor oil, peanut oil, canola [rape seed] oil, and olive oil; semi-drying oils such as cottonseed oil and sesame seed oil; drying oils such as hemp seed oil, linseed oil, tung oil, and oiticica oil; vegetable fats such as coconut, babassu, and palm; and tall oil) or raw soapstocks can be substituted for the soybean acid oil with comparable results. Blends of various acid oils and/or soapstocks are also contemplated. A primary consideration in choosing an acid oil is its cost and local availability. If desired, of course, and if cost considerations permit, other vegetable oils can be blended with the acid oils and/or soapstocks. It will likewise be appreciated that the exact ratios of components in the sweeping compound are subject to considerable variation without departing from the spirit of the invention.

A number of modifications to the sweeping compound are also contemplated. For example, an antistatic agent such as quaternary ammonium salts may be incorporated. A surfactant may be included to enhance wetting of the sawdust by the acid oil. If desired a mold preventive material may be included. All such modifications are considered to fall within the scope of the present invention.

What is claimed is as follows:

1. A biodegradable nontoxic sweeping composition, comprising in combination a uniform mixture of (a) inorganic particulate material, (b) sawdust, and (c) a plant-derived liquid consisting essentially of pine oil acid or a vegetable acid oil byproduct obtained during the refining of vegetable oil.

2. The sweeping composition of claim 1 wherein the liquid is a vegetable acid oil byproduct obtained during the refining of vegetable oil.

3. The composition of claim 2 wherein an amount of antioxidant sufficient to inhibit rancidity of the acid oil is also present.

4. The composition of claim 3 wherein the antioxidant is soluble in the vegetable acid oil.

5. The composition of claim 2 wherein the vegetable acid oil is soybean acid oil.

6. The composition of claim 4 wherein the antioxidant is a mixture of (a) butyl hydroxy toluene and (b) a blend of glyceryl monooleate, corn oil, tert-butylhydroquinone, propylene glycol, and citric acid.

7. The composition of claim 6 wherein about 0.02% by weight of the total composition is butyl hydroxy toluene and about 0.04% by weight of the total composition is a blend of glyceryl monooleate, corn oil, tert-butylhydroquinone, propylene glycol, and citric acid.

8. In a floor sweeping composition comprising a uniform blend of sand, sawdust, and oil, the improvement that comprises using an oil consisting essentially of a vegetable acid oil, or pine oil acid, whereby the composition is rendered biodegradable.

* * * * *